(12) United States Patent  (10) Patent No.: US 6,606,540 B1
Gross  (45) Date of Patent: Aug. 12, 2003

(54) PRESSURE SENSOR SYSTEMS AND METHODS FOR USE IN ROBOTIC DEVICES

(75) Inventor: William Gross, Pasadena, CA (US)

(73) Assignee: Idealab, Pasadena, CA (US)

(*) Notice: Subject to any disclaimer, the term of this patent is extended or adjusted under 35 U.S.C. 154(b) by 0 days.

(21) Appl. No.: 10/134,704

(22) Filed: Apr. 26, 2002

Related U.S. Application Data

(60) Provisional application No. 60/287,051, filed on Apr. 26, 2001.

(51) Int. Cl.[7] .......................... G05B 15/00; G05B 19/00
(52) U.S. Cl. ...................... 700/258; 700/245; 700/225; 700/259; 700/300; 701/200; 701/207; 701/213; 701/217; 701/220; 701/28; 318/568.11; 901/47
(58) Field of Search ................... 700/245, 258, 700/225, 250, 259, 300; 701/200, 207, 213, 217, 220, 28; 318/568.11; 901/47

(56) References Cited

U.S. PATENT DOCUMENTS

| | | | | |
|---|---|---|---|---|
| 4,822,647 A | * | 4/1989 | Nozaki et al. | 427/421 |
| 5,811,055 A | * | 9/1998 | Geiger | 266/49 |
| 6,408,225 B1 | * | 6/2002 | Ortmeier et al. | 700/254 |
| 6,477,447 B1 | * | 11/2002 | Lin | 700/301 |

FOREIGN PATENT DOCUMENTS

| | | | | |
|---|---|---|---|---|
| GB | 2 192 567 A | * | 1/1988 | |
| JP | 408086190 A | * | 4/1996 | |
| JP | 2000355290 A | * | 12/2000 | |

OTHER PUBLICATIONS

Ouchi et al., Handshake telephone system to communicate with voice and force, 1997, IEEE, pp. 466–471.*
Sato et al., Measuring system for grasping, 1996, IEEE, pp. 292–297.*
Karlsson et al., A glove equipped with finger flexion sensors as command generator used in a fuzzy control system, 1998, IEEE, pp. 1330–1334.*

* cited by examiner

*Primary Examiner*—William A. Cuchlinski, Jr.
*Assistant Examiner*—McDieunel Marc
(74) *Attorney, Agent, or Firm*—Knobbe, Martens, Olson & Bear LLP

(57) ABSTRACT

An optical pressure sensor useable in robotic applications. The optical pressure sensor can be included in a robotic grasping device. The pressure sensor includes a sensor structure having an interior wall and indicia. The indicia, apparent by viewing the interior wall, appearance change in response to pressure on the structure. An image sensor is positioned to view at least a portion of the interior wall, wherein the image sensor is configured to provide images of the indicia as the sensor structure is subject to pressure.

25 Claims, 4 Drawing Sheets

PRESSURE SENSOR SYSTEMS AND METHODS FOR USE IN ROBOTIC DEVICES

PRIORITY CLAIM

This application claims the benefit under 35 U.S.C. 119(e) of U.S. Provisional Application No. 60/287,051, filed Apr. 26, 2001, which is incorporated by reference herein in its entirety.

BACKGROUND OF THE INVENTION

1. Field of the Invention

The present invention is related to pressure sensors, and in particular, to pressure sensors useable in robotic devices.

2. Description of the Related Art

Robotic systems often incorporate a robotic grasping mechanism. The robotic grasping mechanism is used to pick up and physically manipulate a work piece. In order to perform many desired manipulation operations, it is necessary to measure the pressure or force exerted by the grasping mechanism on the work piece, the contour of the pressure or force, as well as to measure any sliding motion of the work piece while in the grasping mechanism. Conventional pressure measuring solutions have been cumbersome and expensive, while often failing to provide sufficient pressure information.

For example, microswitches embedded on robotic fingers have been used to sense pressure. However, a microswitch, which is generally an on/off device, typically only indicates that pressure is being exerted on the microswitch, but does not provide information on the amount of pressure. In addition, hundreds or thousands of microswitches may be needed to provide sufficient pressure contour information. The associated wiring and expense makes the use of microswitches impractical in many applications.

Alternatively, hundreds or thousands of capacitive pressure sensors, each employing two metal plates separated by a layer of nonconductive foam and a parallel inductor, have been used to sense pressure. Unfortunately, a capacitive pressure sensor can give misleading readings when a good electrical conductor comes very close to the plates, changing the capacitance even if physical contact is not made. Thus, the capacitive pressure sensor may misinterpret proximity as pressure.

In an attempt to solve some of the problems associated with the capacitive pressure sensors described above, elastomer pressure sensors have been used in robotic applications. The elastomer is a foam pad with resistance that varies depending on how much it is compressed. An array of electrodes is connected to the top of the pad and an identical array is connected to the bottom of the pad to provide corresponding mates to the top electrodes. Each electrode in the top array receives a negative voltage, and its mate in the bottom array receives a positive voltage. When pressure appears at some point on the pad, the material compresses at and near that point, reducing the resistance between certain electrode pairs. This causes a current increase in a particular region in the pad. The location of the pressure can be determined according to which electrode pairs experience the increase in current. The extent of the pressure can be determined by how much the current increases. However, often hundreds or thousands of elastomer pressure sensors are needed to provide an adequate sensing surface for sensing pressure contours. In addition, the top and bottom arrays need to be precisely aligned for the sensor to operate properly. The associated expense and cumbersome interconnect wiring makes the use of such sensor impractical for many applications.

SUMMARY OF THE INVENTION

The present invention provides a novel optical pressure sensor useable in robotic applications, such as in conjunction with robotic grasping devices.

In one embodiment, an optical sensor is positioned to view the interior of a portion of a structure useable as part of a robotic grasping device, and to observe optically visible changes resulting from the exertion of pressure by or on the structure or on materials covering the structure. The images can then be used to determine the location and amount of pressure, as well as changes in the amount and location of pressure.

In one preferred embodiment, an optical sensor is positioned to view the interior of a substantially transparent structure forming at least a portion of a grasping device. The substantially transparent structure is at least partly covered by a base material having raised protrusions or projections thereon. The raised protrusions are positioned between the base material and a wall of the transparent structure. The raised protrusions visibly compress in response to pressure, such as the pressure resulting from the grasping device grasping an object. The optical sensor captures, through the transparent structure, images of the visible compression, and transmits the images to a processor for pressure determinations.

In one embodiment, the transparent structure is tubular in shape. In another embodiment, the transparent structure is spherical in shape. In yet another embodiment, the transparent structure is flat in shape. Optionally, the protrusions are formed from a foam material. The protrusions can be one of a pyramid shape, a spherical shape, a column shape, a conical shaped, a rod shape, and a complex shape. The optical sensor can include a lens to aid in viewing the protrusions.

In one embodiment, the processor executes a software module that utilizes the compression images from the optical sensor to determine the pressure exerted on at least one protrusion.

In yet another embodiment, a robotic grasping device includes a structure made of a resilient material with markings thereon. The structure deforms in response to pressure exerted on the structure. An image sensor views the markings, wherein the view changes as the structure is deformed. The image sensor captures images of the deformation, and transmits the images to a processor for pressure determinations.

In still another embodiment, a material that changes its optical characteristics in response to pressure or strain is used to sense pressure. For example, a coating, film or membrane of cholesteric liquid crystals is applied to, or overlays the sensor structure. For example, a coating, film or membrane of cholesteric liquid crystals is applied to, or overlays the sensor structure. When the structure, and hence the film, is subject to pressure, the patterns of internally reflected light off the film, as viewed by the image sensor, will change. The greater the pressure or strain, the greater the change in the film's optical properties. Based on the amount and location of change in reflected light patterns, the pressure determination software module determines where pressure is being applied and how much pressure is being applied.

In one embodiment, polarized light is used to sense pressure. The light may be polarized by a transparent plastic sensor structure, via a polarizing filter placed over a light source, or the light can be emitted from an intrinsically polarized light source. The polarized light is emitted into the sensor structure. The structure is provided with an outer mirrored or reflective coating. A polarizing filter overlies the image sensor. The pressure and strain patterns within the sensor structure are rendered visible under optical polarization, and so can be imaged by the image sensor.

BRIEF DESCRIPTION OF THE INVENTION

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

The present invention is directed to a novel optical pressure sensor useable in robotic applications. As will be described in greater detail below, an optical sensor is mounted in a robotic grasping device. The grasping device is covered with a resilient material that deforms in response to pressure exerted on the material. The optical sensor visually observes the deformation of the resilient material and provides the deformation information to a processor. The processor analyzes the deformation information and, based on the deformation information and information relating to the resilient material, determines the amount of pressure exerted on or by different points of the grasping device. The pressure information can then be used as feedback information used to appropriately control the grasping device actuators, thereby modulating the pressure exerted by the grasping device. The actuators may be, by way of example, pneumatic cylinders and/or DC motors which are well known to one of ordinary skill in the field.

Figure 1:
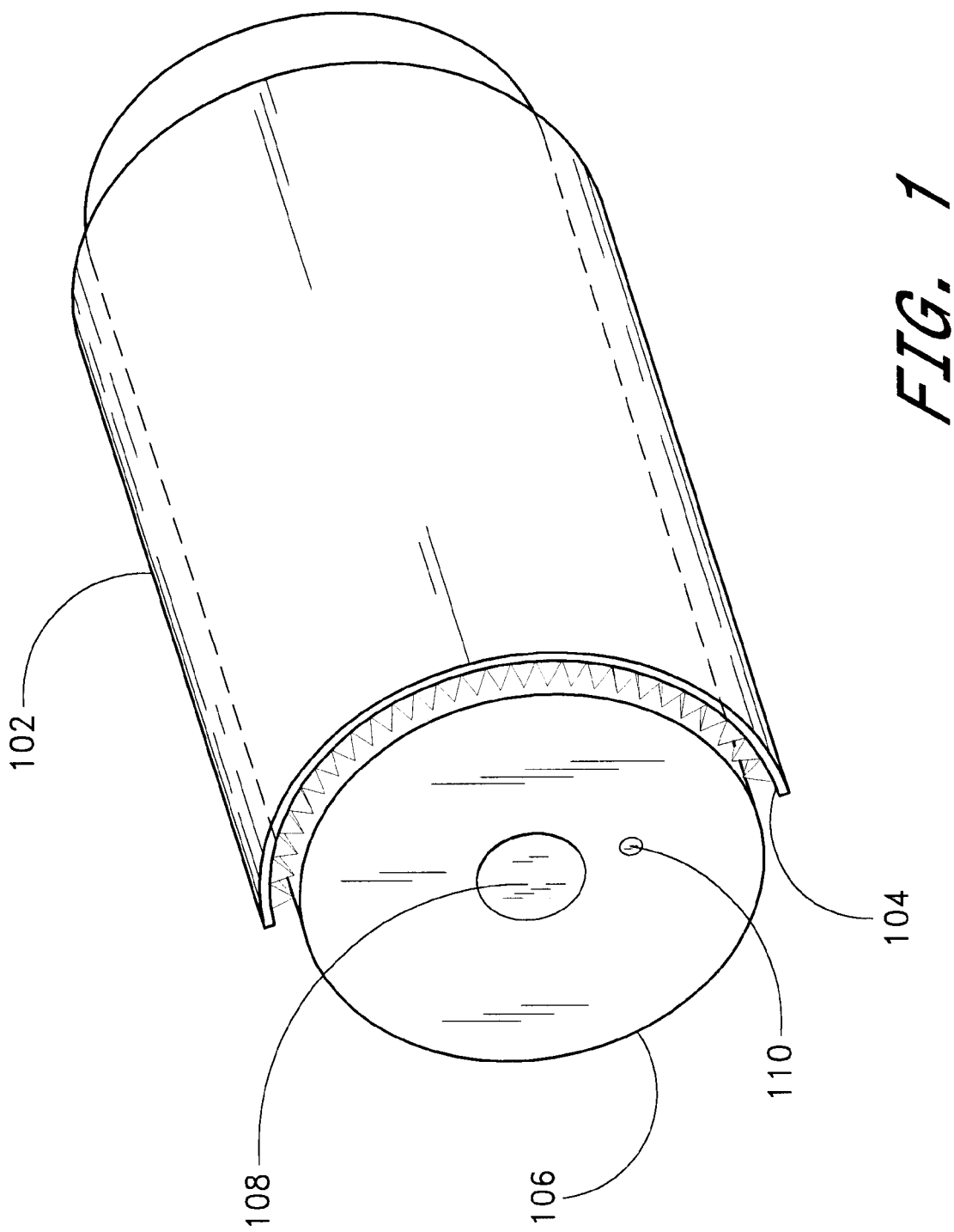
FIG. 1 illustrates a first example embodiment of the present invention.

In one embodiment 100, illustrated in FIG. 1, an image sensor 108 is mounted at one end of a cylindrical or tube-shaped structure 106, a least a portion of which is substantially optically transparent. The image sensor 108 can be, by way of example, a digital camera sensor. The structure 108 can be formed from plastic, acrylic, polycarbonate or the like. The tube-shaped structure 106 forms a portion of a robotic grasping device, such as a robotic "finger." For clarity, the finger actuators are not illustrated. In another embodiment, multiple image sensors may be distributed at different points within the structure 106 to provide an enhanced view of and through the interior structure wall. The tube-shaped structure 106 is partly or completely covered by foam or other base material 102 having a compressible or elastic raised regular or random pattern portion 104 that is in contact with the outer surface of the tube-shaped structure 106. The raised portion 104 may be formed from the base material 102 or may be separately attached to the base material 102.

The raised pattern portion 104 may be, by way of example, repeating pyramid shaped protrusions. Other raised shapes may be used as well. For example, the raised portion 104 may have protrusions that are spherically shaped, column shaped, cone shaped, conical section shaped, paraboloid shaped, rod shaped, or a mixture of shapes. The density of the protrusions may be selected based on the desired degree of contour resolution. The resiliency or compressibility of the protrusion material may be selected based on the desired degree of sensitivity and the desired range of pressures that are to be sensed. All protrusions may have the same compressibility. Alternatively, different protrusions may have differing degrees of compressibility. For example, to enhance the "sensitivity" or resolution at the "finger tip," protrusions with a higher degree of compression than used elsewhere on the finger can be employed.

The foam or other base material 102 may optionally be covered by an outer covering on the side opposite the protrusions. The outer covering is comprised of a flexible material, forming the outer surface of the grasping device, thereby protecting the base material and improving the appearance of the grasping device. A light source 110, such as an LED, is mounted within the tube-shaped structure 106 to illuminate the protrusions through the tube wall. Preferably, the outer covering, base material 102, or other coating blocks stray light from entering the tube-shaped structure 106 and impinging on the sensor 108.

The image sensor 108, located within the tube-shaped structure 106, views the raised portion protrusions through the substantially transparent tube-shaped structure 106. The tube-shaped structure 106 may, in some embodiments, be tapered to enhance the view of the raised pattern portion 104. The image sensor 108 continuously sends corresponding image signals to a processor which will determine the amount of pressure exerted on or by the grasping device, as explained below. Optionally, a lens, such as a fisheye lens, may be positioned over the sensor to expand or shape the field of view so that an adequate view of the protrusions is provided. The lens may be a conventional lens or a diffractive optical element.

During a grasping or manipulation operation, the outer surface of the grasping device, which may be in the form of a robotic finger or probe, will come into or be in contact with an object. During such operations at least some of the protrusions will compress and deform. The amount of compression and deformation will vary from protrusion to protrusion in response to the pressure being exerted on the protrusions during the grasping operations. Thus, for example, a protrusion under pressure will at least partly flatten-out against the outer surface of the tube.

The amount of deformation varies in an amount corresponding to the pressure or force exerted on a given protrusion. Thus, the protrusions which will deform or compress the most are generally those directly under the area where the finger comes into contact with the object. The further the protrusions are from the point of contact or maximum pressure, the less they will deform or compress. Protrusions sufficiently far from the point or points of pressure may not further compress or deform at all.

To further highlight the protrusions, the protrusions may be in a contrasting color or have greater reflectivity as compared to the background color of the base material. For example, the protrusions may be white in color and the base may be black in color.

The image sensor 108 views the protrusions and resulting deformations and transmits corresponding image information to the processor. The processor analyzes the image information to determine the pressure contour, including the amount and location of pressure being exerted at the various points along the grasping device. In analyzing the image information, the processor executes a pressure determination software module. The module compares current image information with information relating to a reference image. The reference image is the image of the protrusions in a non-pressured state or a quiescent state wherein the grasping device is not grasping or in contact with a work piece or other object. The reference image may optionally be taken and stored in memory as part of a start-up or calibration procedure.

For each observed protrusion, the module compares, from a substantially current image, the amount of surface area of the protrusion in contact with the exterior of the tube wall with the amount of surface area of the protrusion in contact with the exterior of the tube wall in the reference image. Based on this comparison, the module calculates a relative area difference. In one embodiment, the module uses the area difference as an index into a pressure-mapping table which maps area differences to an amount of pressure. For example, for a given protrusion resilience, if the surface area of the protrusion in contact with the exterior side of the tube wall quadruples from the reference image, the module will look up the corresponding pressure in the pressure mapping table. By way of further example, each protrusion may provide 8 bits (256) of pressure information, and so the pressure-mapping table will have 256 entries.

If the protrusions do not all have the same degree of compressibility, a separate pressure-mapping table may be used for each group of protrusions having a given degree of compressibility. In such an instance, a location/compressibility-mapping table is used which maps the physical location of each protrusion or group of protrusions to a corresponding pressure mapping table identifier. Thus, when determining the pressure exerted on a given protrusion, the module first uses the physical location of the protrusion as a look-up address for the location/compressibility mapping table, and uses the mapped-to pressure mapping table identifier to locate the appropriate pressure-mapping table. The appropriate pressure-mapping table is then used to determine the pressure exerted on the protrusion, as previously described.

Advantageously, the sensing system described above enables the measurement of forces indicating the relative motion of a work piece relative to the grasping device. For example, if the grasping device, in the form of two fingers, is holding a spoon and the spoon is slipping between the fingers, the compression of the protrusions will be changing in response to changes in pressure resulting from the sliding of the spoon. The image sensor 108 captures multiple image frames of the protrusions each second. The image sensor 108 transmits the image information, showing the dynamically changing protrusion deformations, to the processor. The pressure determination software module then calculates not only the pressure contour at a given moment, but also calculates, based on the changing contours, the velocity and/or acceleration of the spoon as it slips through the robotic fingers.

The pressure sensing system described above does not require a tube structure in all embodiments. For example, in one embodiment, rather than a tube-shaped structure 106, a sphere may be used. Similarly, the sensor system can use a flat panel covered on the sensing side with a material having raised protrusions as similarly described above with respect to the tube implementation. Other structure shapes, such as conical-shaped structures, conical section-shaped structures, or paraboloid shaped structures, can be used as well.

Instead of, or in addition to the sensing techniques discussed above, which utilize compressible or elastic protrusions situated between an outer material and a structure wall, other optical sensing techniques can be used to sense pressure.

Figure 2:
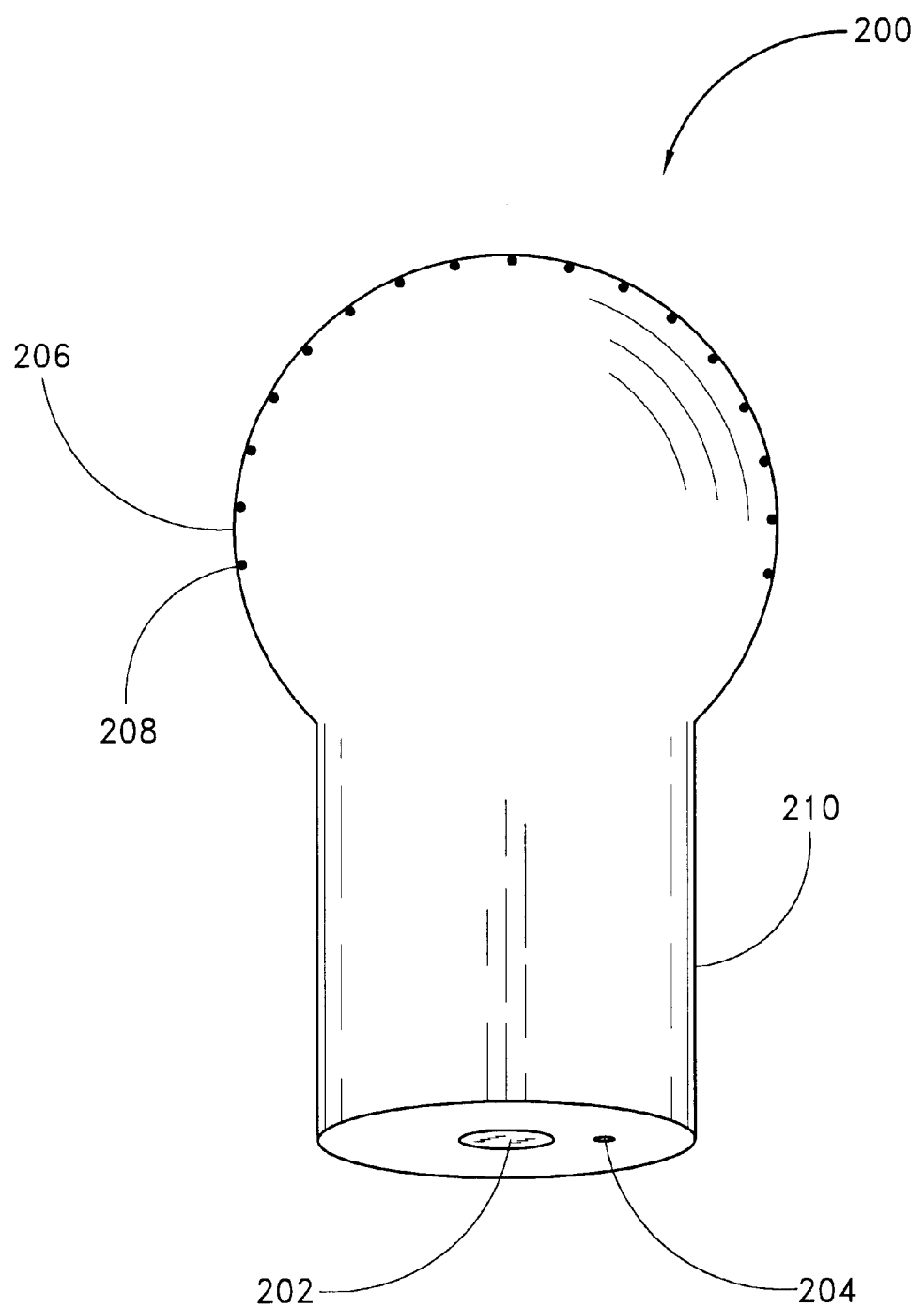
FIG. 2 illustrates a second example embodiment of the present invention.

For example, in another embodiment 200, illustrated in FIG. 2, rather than using a material having a raised pattern to measure pressure, the sensor structure 206 itself deforms in response to pressure. In this example, the structure 206 is a spherically-shaped structure positioned or formed at the end of a tube 210. The spherically-shaped structure 206 may be made of a resilient plastic, rubber or other resilient materials. The interior wall of the spherically-shaped structure 206, or, if the wall is transparent, optionally exterior of the wall, has printed regular or random patterns 208, speckles or other markings formed thereon. Alternatively, the printed patterns 208, speckles or other marking may be formed within or through the wall. By way of example, the pattern may be 0.1 inch diameter dots spaced 0.25 inches apart. In another example, the pattern 208 may be a graph pattern similar to the pattern found on graph paper.

In still another example, the pattern 208 may be spray painted on using a textured paint the forms bumps on the structure wall. The color of the markings 208 and the background color of the structure 206 wall are selected to enhance the visibility of the markings. For example, in one embodiment, the markings 208 are black in color and the background is white. As pressure is applied to the spherically-shaped structure 206, the portions of the spherically-shaped structure 206 on which pressure is being exerted will bend or bow in proportion to the exerted pressure. The apparent appearance of the markings 208 as viewed by the image sensor 202 will correspondingly change. For example, the density of the markings 208 will appear to decrease as the wall is bowed inward. Based on this change in density, the pressure determination software module determines where pressure is being applied and how much pressure is being applied.

Figure 3:
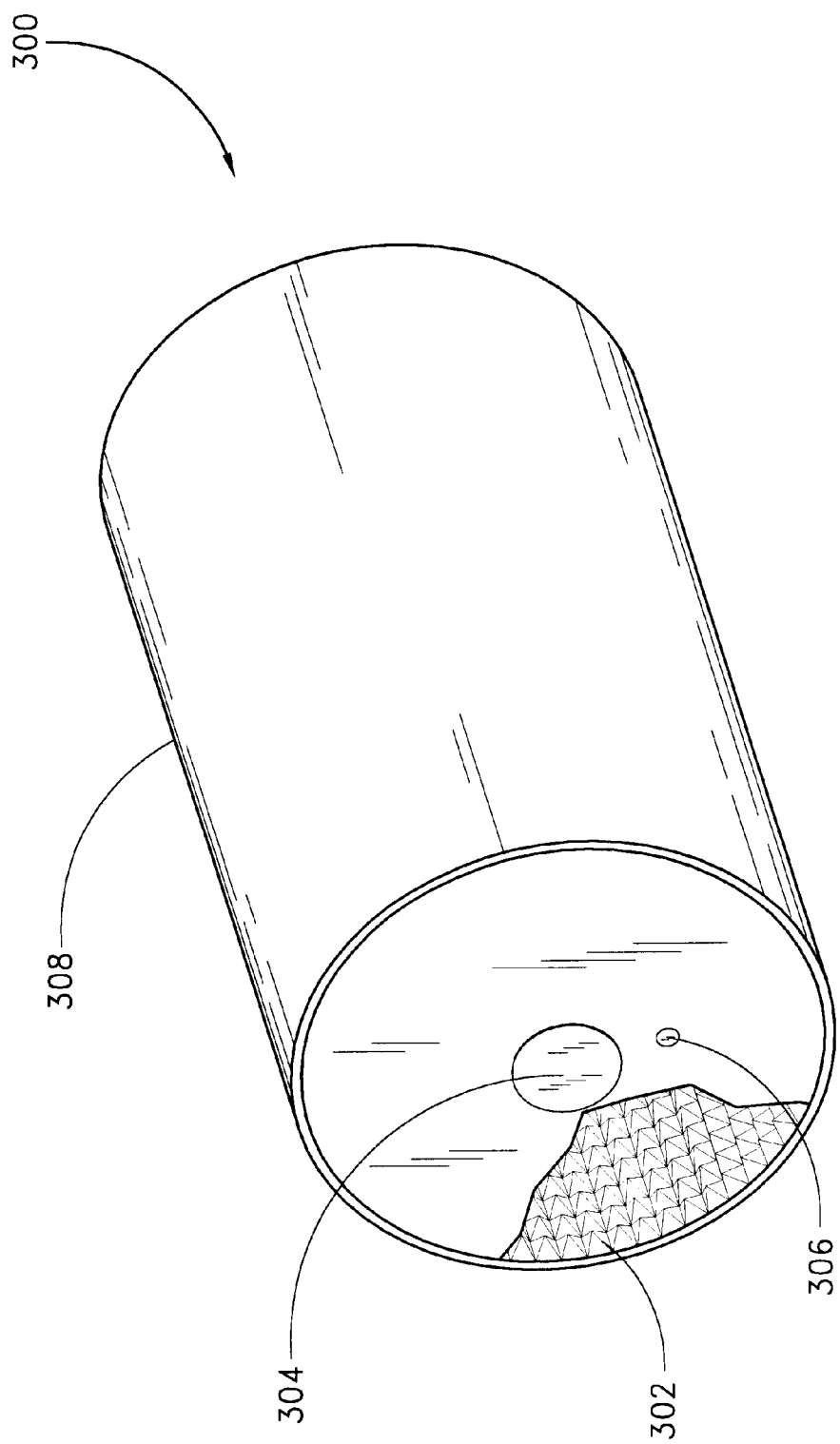
FIG. 3 illustrates a third example embodiment of the present invention.

In yet another embodiment 300, illustrated in FIG. 3, the sensor structure 308 has protrusions 302 extending inwardly from the structure's interior-side wall. The pointing angle of the protrusions 302 change in response to pressure being exerted on the structure 308. The color of the protrusions 302 and the background color of the structure 308 wall are selected to enhance the visibility of the protrusions 302. For example, in one embodiment, the protrusions 302 are black in color and the structure wall background is white. As pressure is applied to the structure 308, the portions of the structure 308 on which pressure is being exerted will bend or bow in proportion to the exerted pressure. The pointing angles of the protrusions 302 as viewed by the image sensor 304 will correspondingly change. Based on this change in pointing angle, the pressure determination software module determines where pressure is being applied and how much pressure is being applied.

In still another embodiment, a material that changes its optical characteristics in response to pressure or strain is used to sense pressure. For example, with respect to FIG. 1, rather then covering the tube-shaped structure 106 with a base material having raised portions, a coating, film or membrane of cholesteric liquid crystals is applied to the structure 106. When the structure 106, and hence the film, is subject to pressure, the patterns of internally reflected light off the film, as viewed by the image sensor 108, will change.

In yet another embodiment, polarized light is used to sense pressure. The light may be polarized by the transparent plastic sensor structure, via a polarizing filter placed over the light source, such as light source 110, or the light can be emitted from an intrinsically polarized light source, such as a solid-state laser diode. The polarized light is emitted into the sensor structure, such as the transparent rigid structure 106 or the elastic plastic finger structure 210 discussed above. The structure is provided with an outer or inner mirrorized coating. An image sensor, such as image sensor 108 or 202, is covered with a polarizing filter. The pressure and strain patterns within the plastic finger are rendered visible under optical polarization, and so can be imaged by the image sensor.

Figure 4:
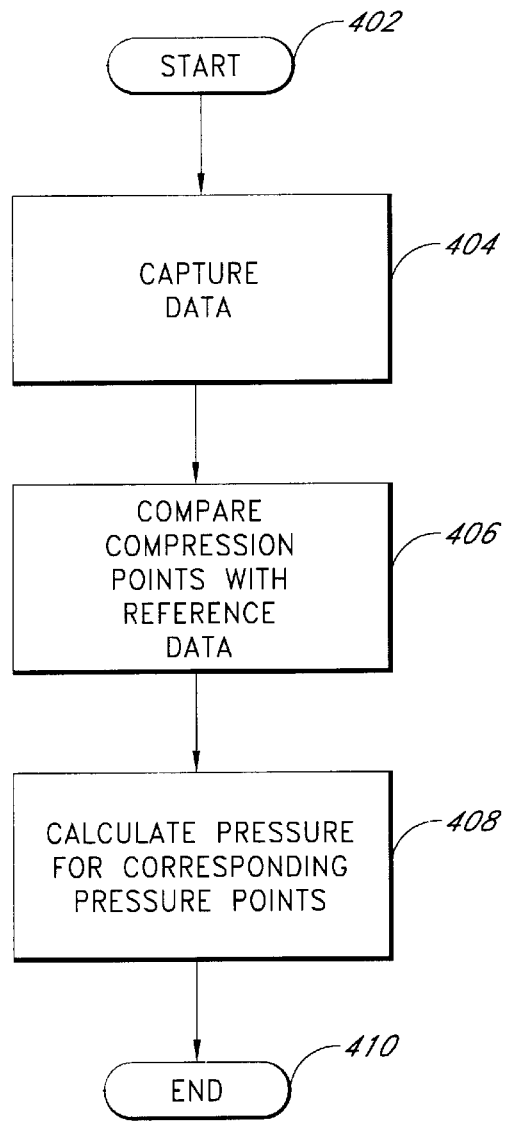
FIG. 4 illustrates an example pressure measurement process.

FIG. 4 illustrates and example pressure determination process 400. The process 400 begins at start state 402 and proceeds to state 404 where an image is captured of the pressure indicators or points. For the embodiment illustrated in FIGS. 1 and 2, the image will be of the protrusions. For the embodiment illustrated in FIG. 2, the image will be of the markings. Proceeding to state 404, the image is compared to reference data. The reference data may be data related to reference image of the sensor when the sensor is not being subject to an external pressure. This reference image data can be generated during a calibration state, which can be periodically performed. At state 406 the pressure is calculated based on the comparison performed at state 406. In another embodiment, rather then comparing the image to reference data, a mathematical pressure model is used, wherein the amount of deformation is measured visually and then used to calculate the pressure that would be needed to cause such a deformation. The process 400 then ends at state 410.

The image sensors 108, 202, 304 may be, by way of example, a low cost, low power CMOS image sensor from Kodak, part number KAC-0310. The CMOS image sensor comprises a ⅓" format pixel array with 640×480 active elements. Thus, the CMOS image sensor advantageously provides 307,200 sensing elements. The CMOS image sensor utilizes 7.8 mm square pixel elements, with a pinned photodiode architecture providing high sensitivity and low noise. The sensor includes an analog image acquisition, digitizer and digital signal processing system on a single chip. The chip includes a processing pipeline. The processing pipeline includes CDS, a Frame Rate Clamp (FRC), and a 10-bit ADC that converts the analog data to a 10-bit digital word stream. The image sensor has a frame rate of up to 60 frames per second. The small size of the sensor makes it suitable for use in relatively small grasping devices, such as robotic fingers. In addition, the low power and the low cost of the sensor makes it suitable for battery powered robotic devices and cost sensitive home-based robotic applications.

Of course, other image sensor types can be used as well. For example, CCD-type image sensors may be used. In addition, sensors having fewer or larger numbers of pixels may be used, depending on the desired resolution of pressure measurements, the desired size, and cost restrictions. The processor may be a general purpose microprocessor, such as a Pentium-class or PowerPC processor, or a programmable signal processor, such as a TI TMS320 class digital signal processor.

While the above description illustrates the use of the novel optical pressure sensor in the context of a robot grasping device, the pressure sensor can of course be used in other pressure sensing applications. For example, the pressure sensors described above can be utilized to measure force and strain for robotic limbs and joints. Further, the sensors described above can be used for whole-body robotic applications using one or more image sensors viewing all or part of the strain patterns on a robotic body or other effector or structure. Thus, for example, in some embodiments, the camera or other image sensor is located outside of the limb or structure in which force or strain is being sensed to thereby image the strain or force patterns for processing by the pressure determination module, as similarly described above.

It should be understood that certain variations and modifications of this invention will suggest themselves to one of ordinary skill in the art. The scope of the present invention is not to be limited by the illustrations or the foregoing descriptions thereof.

What is claimed is:

1. A robotic grasping device pressure sensor, comprising:
   a structure, at least a portion of which is transparent;
   a base material overlaying at least a portion of the transparent portion of the structure;
   compressible protrusions extending from the base material to the structure, wherein the protrusions compress in response to pressure exerted on the base material; and
   an optical image sensor positioned to view at least a portion of the compressible protrusions from within the structure, wherein the optical image sensor is configured to capture images of the compressible protrusions as they compress, and to provide image information to a processor that extracts pressure information from the images.

2. The robotic grasping device pressure sensor as defined in claim 1, wherein the robotic grasping device is a robot finger.

3. The robotic grasping device pressure sensor as defined in claim 1, wherein the structure is tube shaped.

4. The robotic grasping device pressure sensor as defined in claim 1, wherein the protrusions are pyramid shaped.

5. The robotic grasping device pressure sensor as defined in claim 1, wherein the protrusions are formed from foam.

6. The robotic grasping device pressure sensor as defined in claim 1, further comprising a light source positioned to illuminate the protrusions.

7. The robotic grasping device pressure sensor as defined in claim 1, wherein the protrusions are attached to the base material.

8. The robotic grasping device pressure sensor as defined in claim 1, wherein the protrusions are formed from the base material.

9. The robotic grasping device pressure sensor as defined in claim 1, wherein a first portion of the protrusions have a different degree of compressibility than a second portion of the protrusions.

10. The robotic grasping device pressure sensor as defined in claim 1, wherein the protrusions are a first color and the base material is a second color.

11. A robot grasping device, comprising:
    a first grasping structure, including:
       a sensor structure having an interior wall;
       indicia, apparent by viewing the interior wall, whose appearance change in response to pressure;
       an image sensor positioned to view at least a portion of the interior wall, wherein the image sensor is configured to provide images of the indicia as at least a portion of the sensor structure is subject to pressure; and
    a second grasping structure positioned to grasp an object in cooperation with the first grasping structure.

12. The robot grasping device as defined in claim 11, wherein the sensor structure is deformable.

13. The robot grasping device as defined in claim 11, wherein the indicia are deformable protrusions.

14. The robot grasping device sensor as defined in claim 11, wherein the sensor structure is deformable and the indicia are markings.

15. The robot grasping device as defined in claim 11, wherein the indicia are formed by light passing through cholesteric liquid crystals.

16. The robot grasping device as defined in claim 11, wherein the image sensor includes an analog image acquisition circuit and a digitizer circuit.

17. The robot grasping device as defined in claim 11, wherein the structure is tube shaped.

18. The method as defined in claim 17, wherein the robot pressure sensor further comprises:

a structure, at least a portion of which is transparent;

a base material overlaying at least a portion of the transparent portion of the structure, wherein the indicia are deformable protrusions extending from the base material to the structure, and wherein the protrusions are deformable in response to pressure exerted on the base material; and an image sensor positioned to view at least a portion of the deformable protrusions.

19. The method as defined in claim 17, wherein the robot pressure sensor further comprises:

a deformable structure having the indicia thereon, wherein the indicia move in response to force exerted on the deformable structure; and an image sensor positioned to view at least a portion of the pressure indicia.

20. The method as defined in claim 17, wherein the indicia are formed by light passing through cholesteric liquid crystals.

21. The method as defined in claim 17, further comprising determining a location of the pressure.

22. The robot grasping device as defined in claim 11, wherein the image sensor provides pressure contour information.

23. The robot grasping device as defined in claim 11, further comprising a fish eye lens positioned in front of the image sensor.

24. A method of determining the pressure on a robot pressure sensor, the method comprising:

obtaining image data of pressure indicia on the robot pressure sensor;

comparing the image data with reference image data; and determining a degree of pressure based at least in part on the comparison.

25. An apparatus for measuring pressure on a robot component, comprising:

a polarized light source;

a structure having a mirrored surface positioned to receive light from the polarized light source; and an image sensor having a polarized filter, the image sensor positioned to view the mirrored surface, wherein pressure patterns within the structure are rendered visible under optical polarization.

\* \* \* \* \*

UNITED STATES PATENT AND TRADEMARK OFFICE
CERTIFICATE OF CORRECTION

PATENT NO.     : 6,606,540 B1
DATED          : August 12, 2003
INVENTOR(S)    : William Gross It is certified that error appears in the above-identified patent and that said Letters Patent is hereby corrected as shown below:

<u>Title page,</u>
Item [73], Assignee, please delete "Idealab" and insert therefore, -- Evolution Robotics, Inc. --.

Signed and Sealed this

Twenty-fifth Day of November, 2003

JAMES E. ROGAN
*Director of the United States Patent and Trademark Office*